Patented Mar. 22, 1927.

1,621,541

UNITED STATES PATENT OFFICE.

MATTHEW S. HOPKINS, OF READING, AND NORMAN UNDERWOOD, OF SWARTHMORE, PENNSYLVANIA, ASSIGNORS TO CHARLES ENEU JOHNSON AND COMPANY, OF PHILADELPHIA, PENNSYLVANIA, A CORPORATION OF PENNSYLVANIA.

INK AND PROCESS OF MAKING THE SAME.

No Drawing. Application filed June 19, 1924. Serial No. 720,935.

This invention relates to the manufacture of printing inks in which it is of prime importance to produce a compound which shall be stable in its physical characteristics and not deteriorate before its use by the printer. It is also important that the compound shall not undergo chemical decomposition but shall remain properly preserved during the period of storage.

Printing inks have, as a general rule, been made from substances which, in themselves, are highly inflammable and consequently there is considerable fire risk in their storage and use. While it is possible to guard against undue fire risks in ordinary printing and while compounds for ordinary use do not necessarily carry volatile inflammable ingredients, nevertheless there is a wide demand for ink known as "rotogravure" intaglio ink which is used on high speed rotary presses followed by quick drying by artificial means resulting in the volatilization of the inflammable mediums. We have found that a satisfactory ink for this and analogous uses can be compounded from materials in which the fire risk is a minimum and yet without sacrifice of the improved results desired.

It is also a purpose of this invention to avoid the use of compounds for example xylol and the like, which are expensive, and combine with dangerous inflammability, undesirable odors which ofttimes become distressing to the workmen.

A special use to which our invention has been found of material benefit is in intaglio printing, commonly known in the trade as "rotogravure printing." In this work it is essential that the ink fill the engraved portions of the printing plate and that the surplus be readily wiped from the smooth surface. We have found that the compound produced as described in this specification has the minimum adhesion to the smooth printing surface and is wiped clean from the unengraved parts leaving an ample quantity of ink to give the desired impression on the paper.

The basis of our invention consists in combining with an oily coloring compound an aqueous solution in the nature of a binder, producing an emulsion of the two capable of being thinned out to any desired degree and operation and still to remain smooth and workable.

There is the added advantage that the binder increases the binding properties of such gums as may be used in the coloring compound. This is regardless of whether the coloring compound is a mixture of pigments, gums and medium or is a true solution of pigment and gum in medium.

As an example of one manner in which our invention may be carried out, we take the following materials in the proportions stated by weight:

2 Van Dyke brown.
2 gilsonite (solid asphaltum).
1 liquid asphaltum.
2 kerosene.

The liquid asphaltum, when combined with kerosene or an analogous oily vehicle, will accomplish the solution of the gilsonite, giving the necessary flow, et cetera, that heretofore has only been obtained through the employment of xylol and gilsonite. To this is added the Van Dyke brown as a further color ingredient.

A binding composition is prepared from a water-soluble albuminous substance as follows. While it is possible to use various compounds of this description we have found that casein forms a satisfactory starting point. A solution of casein is formed from the following parts by weight:

375 casein.
41 borax.
45 ammonia.
25 sodium fluoride.
2040 water.

Five parts by weight of this solution are thoroughly mixed with seven parts by weight of the coloring compound above described and the mixture is then thinned to the proper consistency with a naphtha, with the desired boiling point, or an analogous substance. The mass is then thoroughly mixed by grinding, milling and the like.

This compound has the physical properties of an emulsion possessing superior properties of suspension, thus preventing stratification. The large proportion of water causes a minimum of fire risk. No ingredient is used which would produce an inflammable vapor or objectionable odor. The product works well into the engraved portions of the printing plate, the excess is readily removed and there is an effective transfer from the plate to the paper. The formula for the casein solution is such as to insure its stability and good keeping qualities. Furthermore the casein solution co-operates in the fixation of the ink to the paper in that under the temperatures at which intaglio printing is carried out there is quicker drying of the compound and an insolubility attained with a permanent water-proof bond to the paper.

It is characteristic of the ink thus formed that there is a uniform intense color imparted to the entire substance as finally used. When this is applied to intaglio or "relief" printing, the effect is heightened. The ink is also reasonably safe from fire risk on account of the constitution above set out, while it is convenient and satisfactory for handling from the viewpoint of the pressman. The readiness with which satisfactory, permanent impressions are made at high speeds makes for efficient results.

It will be evident that numerous substitutions can be carried out in the materials used and that reasonable latitude is possible in the proportions taken without departing from the spirit of the invention and its scope as defined in the following claims.

What we claim is:

1. An emulsified ink composed of a coloring compound having an oily medium, and an aqueous solution of casein, borax, ammonia and sodium fluoride.

2. The process of making an ink consisting in incorporating a solid asphaltum in a mixture of liquid asphaltum and kerosene, and emulsifying the product with an aqueous solution of casein, borax, ammonia and sodium fluoride.

In testimony whereof we have hereunto affixed our signatures.

MATTHEW S. HOPKINS.
NORMAN UNDERWOOD.